(12) United States Patent
Vogel

(10) Patent No.: US 6,474,621 B1
(45) Date of Patent: Nov. 5, 2002

(54) WATER CONTROL APPARATUS FOR SHOWERS

(76) Inventor: Jordan Walter George Vogel, 88 Broadwater Esplanade, Bilambil Heights NSW 2486 (AU)

(*) Notice: Subject to any disclaimer, the term of this patent is extended or adjusted under 35 U.S.C. 154(b) by 0 days.

(21) Appl. No.: 09/674,683

(22) PCT Filed: May 4, 1999

(86) PCT No.: PCT/AU99/00327
§ 371 (c)(1),
(2), (4) Date: Nov. 3, 2000

(87) PCT Pub. No.: WO99/56604
PCT Pub. Date: Nov. 11, 1999

(30) Foreign Application Priority Data

May 5, 1998 (AU) ............................... PP 3335

(51) Int. Cl.⁷ .............................. B05B 1/30; A47K 3/00
(52) U.S. Cl. ......................... 251/148; 251/92; 251/293; 4/605; 239/578; 137/382
(58) Field of Search ............................ 251/90, 91, 148, 251/293, 294; 4/559, 580, 596, 605, 609; 137/377, 382, 382.5; 239/288, 578

(56) References Cited

U.S. PATENT DOCUMENTS

| 4,311,279 A | | 1/1982 | Jette |
| 4,345,621 A | * | 8/1982 | Dunckhorst ................ 4/605 X |
| 4,360,160 A | | 11/1982 | Jette |
| 4,394,969 A | | 7/1983 | Jette |
| 4,427,177 A | | 1/1984 | Constantinescu |
| 4,729,135 A | * | 3/1988 | Titterington ................ 239/578 |
| 4,881,282 A | * | 11/1989 | George et al. ............. 239/578 |
| 5,123,628 A | * | 6/1992 | Yu ........................ 251/209 X |
| 5,152,465 A | * | 10/1992 | Calabro ..................... 239/578 |
| 5,220,697 A | * | 6/1993 | Birchfield .................. 4/605 X |
| 5,263,853 A | * | 11/1993 | Pall ....................... 137/382 X |
| 5,331,694 A | | 7/1994 | Mackenzie et al. |
| 5,499,767 A | * | 3/1996 | Morand ..................... 239/383 |
| 5,590,682 A | * | 1/1997 | Fischer ..................... 137/382 |

FOREIGN PATENT DOCUMENTS

AU 674280 12/1996

* cited by examiner

Primary Examiner—Lesley D. Morris
Assistant Examiner—Eric Keasel
(74) Attorney, Agent, or Firm—Shoemaker and Mattare

(57) ABSTRACT

A control apparatus (10) for controlling flow of water through a shower head (21) supplied with water from conventional taps (11,12) through a water outlet (14), the control apparatus (10) including a flow valve (17) connected to the outlet (14) and operating means for the valve in the form of a rigid rod (24) attached to the valve (17) and extending to a position adjacent the taps (11,12). Movement of the rod (24) in opposite directions effects opening and closing of the valve (17). The rod (24) may also carry a cover or shield to cover the taps (11, 12) to prevent their inadvertent operation.

18 Claims, 5 Drawing Sheets

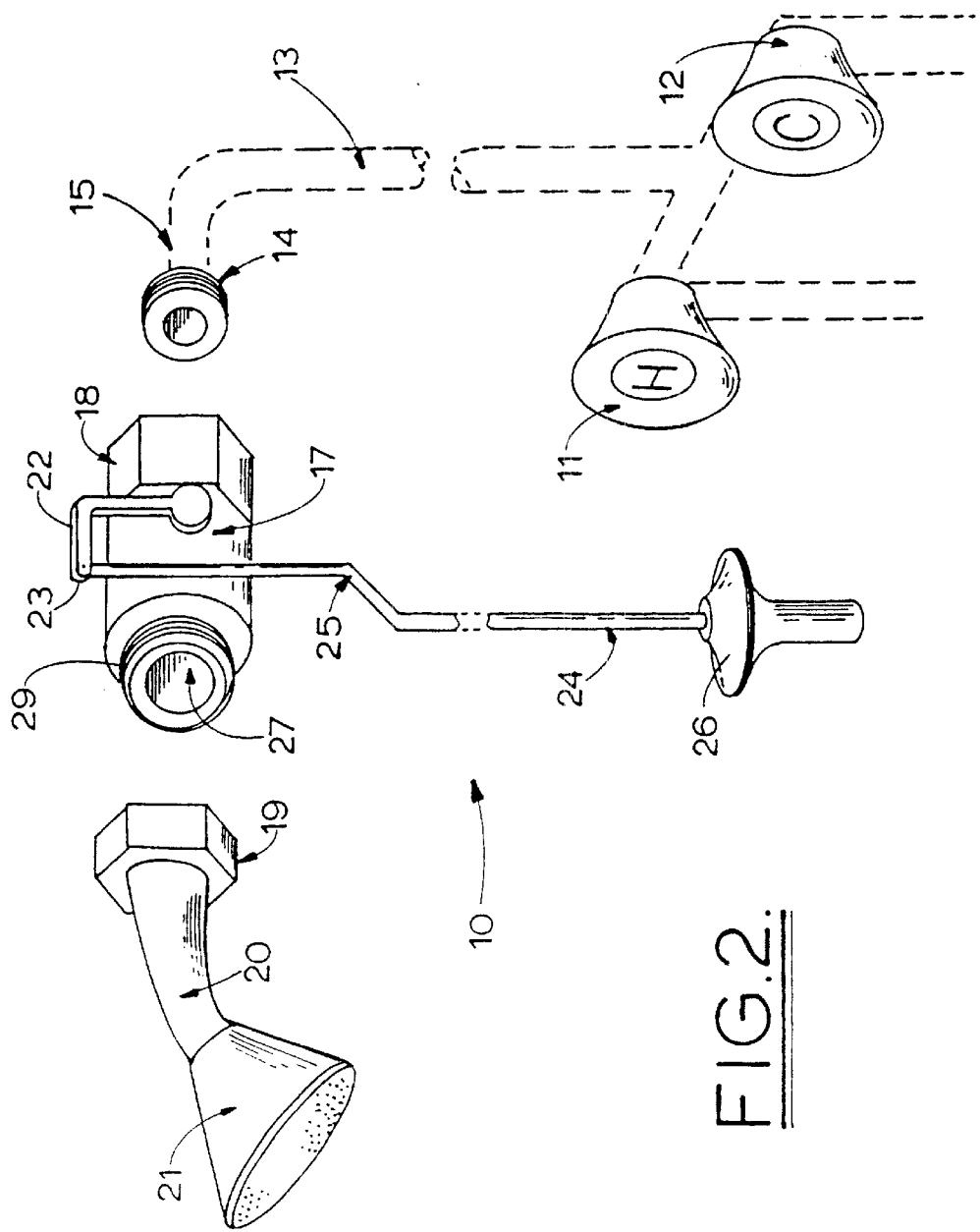
FIG.2.
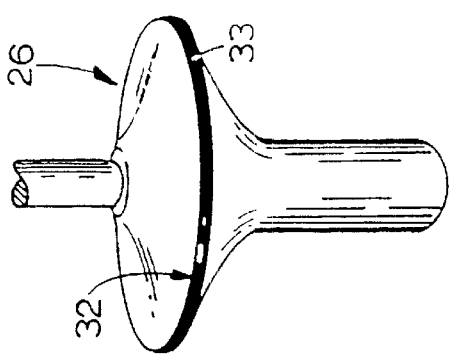
FIG.2.A.

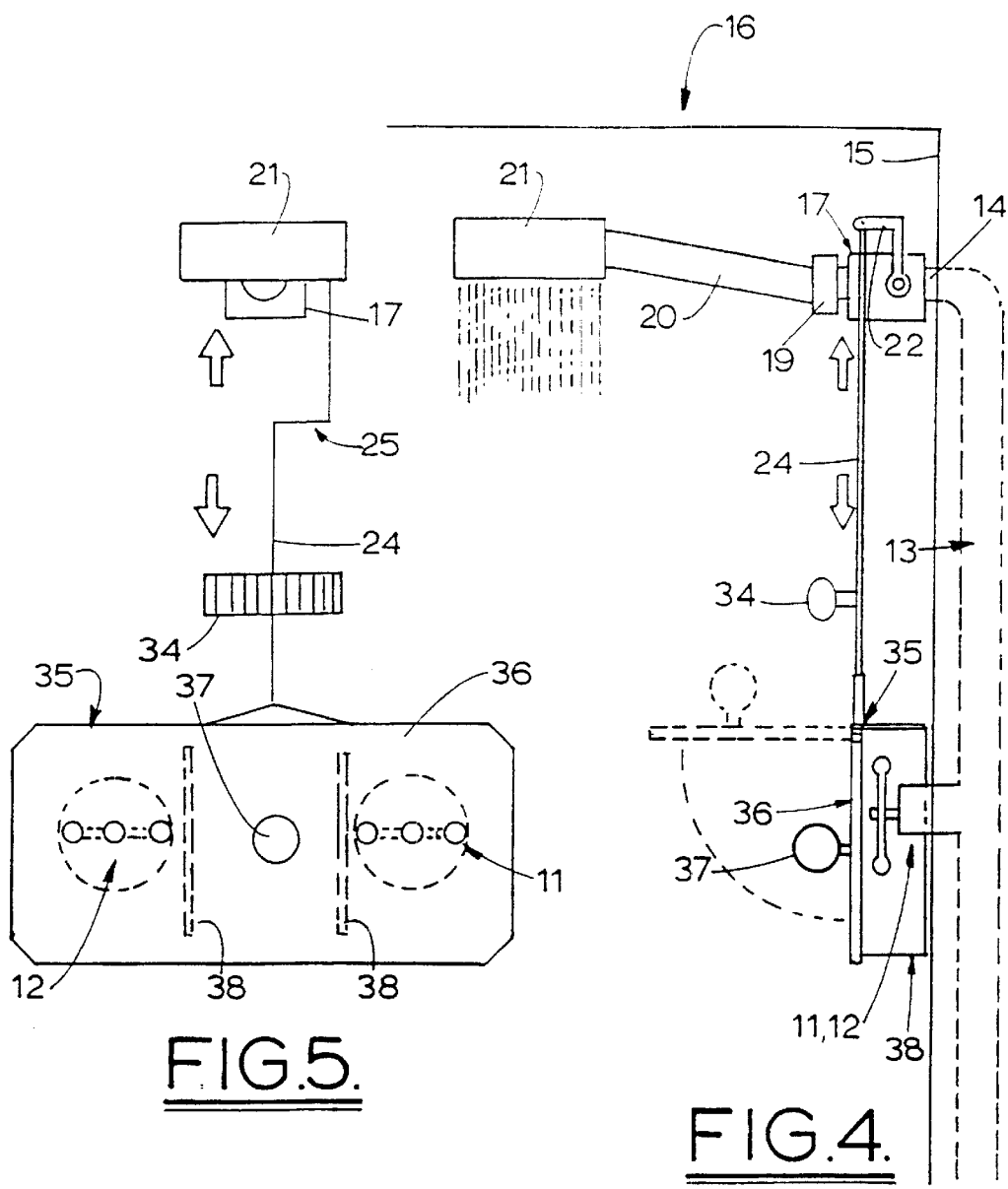
FIG.4.
FIG.5.
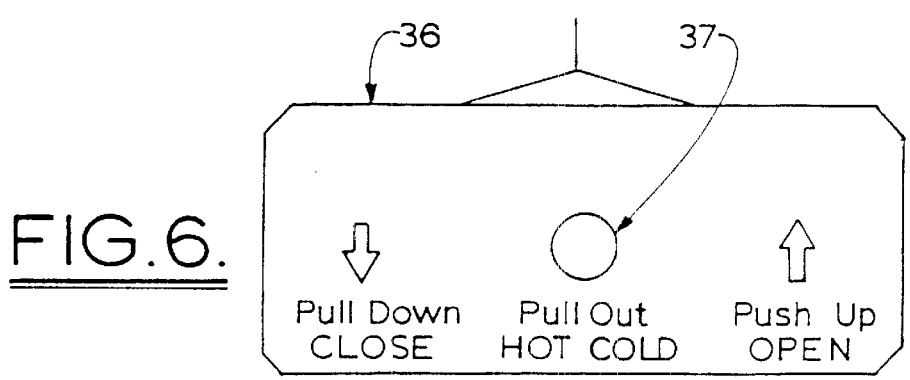
FIG.6.
⇩ Pull Down CLOSE     Pull Out HOT COLD     ⇧ Push Up OPEN

WATER CONTROL APPARATUS FOR SHOWERS

TECHNICAL FIELD

This invention relates to water control apparatus for use in showers and in particular to apparatus for controlling water flow from a water outlet to a shower head or rose of a shower.

BACKGROUND ART

Current conventional shower apparatus usually include separate hot and cold taps which supply water to a threaded shower wall outlet located at a convenient height above the taps and a shower rose or nozzle which is threadably coupled to the outlet. Adjustment of the hot and/or cold taps enables hot and cold water to be mixed and delivered to the shower rose for dispersal over the user. Such an arrangement often requires regular manual adjustment of the hot and/or cold taps to maintain the water at a desired temperature pressure and/or flow particularly when starting the shower to reach a desired temperature/pressure for the user to shower. In such systems also the user cannot simply interrupt the mains water flow without also adjusting the temperature and pressure each time when the water is needed resulting in wastage of water whilst adjusting taps to the desired previous temperature/pressure.

Current systems in use which are designed to reduce wastage of water include systems which incorporate shower loses which limit flow of water by the incorporation of a flow restricting plate having a plurality of small openings therein however the effect to the user is not fully acceptable. Other systems incorporate an inbuilt water mixer valve with an adjustable single lever for pressure and temperature adjustment. These inbuilt systems usually require rile removal and/or wall renovation if required to be installed into existing showers. Usually, this is required to be done by plumbers resulting in high costs. Some pressure adjustment is still required for the mains water mixer to achieve a stop/start shower.

Other on/off systems utilise rotatable shower roses having a temporary pause feature requiring the user to stretch up to turn the rose head to pause the water. This can be difficult for children, the short and the elderly. In addition, the turning feature of the rose can often attract soap and dirt from the user's hands while showering over time and can became calcified and difficult to shift. Being a temporary pause, the hot and cold taps still have to be closed after showering and then turned on and readjusted for subsequent showers.

Australian Petty Patent No 674280 describes Shower apparatus which incorporates a control valve for controlling flow and pressure to a shower head, the valve being located in a shower arm which may be pivoted downwardly for access by a user. This apparatus however has a number of disadvantages. The valve controls both pressure and flow to control the flow of water incrementally and does not provide a desirable on/off effect. The valve is often hot to touch and also is not conveniently located, requiring the arm carrying the shower head to be pivoted downwardly for use which in the case of a running shower is obviously inconvenient resulting in water spraying from the shower head in all directions as the arm is pivoted downwardly and/or upwardly. In addition, this apparatus requires a new replacement shower arm and shower head which adds to expense and may not match the existing shower set furniture.

SUMMARY OF THE INVENTION

The present invention aims to overcome or alleviate one or more of the above disadvantages or at least provide an alternative to the above arrangements by providing control apparatus for use with an existing shower set and plumbing which alleviates the problem of water wastage and which is convenient to use. The present invention further aims to provide water control apparatus for shower apparatus which enables the required temperature and pressure of water to be effectively set and flow thereafter controlled. Other objects and advantages of the invention will became apparent from the following description.

The present invention thus provides in a first aspect control apparatus for a shower having a shower wall, an elevated threaded water outlet extending through said wall and regulating means on said wall for regulating the pressure and temperature of water for flow through said water outlet, said apparatus including a housing, said housing being threaded at one end for connection to said threaded water outlet and at its opposite end for connection to a shower read or shower arm connected to said shower head, said housing including a water flow passage extending therethrough from said one end to said opposite end, a rotatable quarter-turn valve member in said housing for controlling flow from said regulating means through said passage and in use to said shower head or shower arm connected to said shower head, a valve actuating arm connected to said valve member for effecting rotation thereof, said valve actuating arm being located externally of said housing and having a free end remote from its connection to said valve member, and an elongated rigid operating member pivotally connected to the free end of said arm so as to be pivotally movable towards and away from said shower wall, said operating member freely hanging from said valve actuating arm, said operating member terminating in a hand grip located in use adjacent said regulating means but spaced from said wall, and wherein said hand grip may be grasped and moved vertically to move said operating member in opposite directions to cause rotation of said valve actuating arm and said valve member and permit flow of water through or prevent flow of water through said flow passage to said shower head or shower arm connected to said shower head, and wherein when said valve member is in a position permitting said flow through said flow passage, vertical downward movement of said operating member causes said valve member to move to a position preventing flow through said flow passage.

The present invention provides in a further aspect in a shower of the type having a shower wall an elevated threaded water outlet extending through said wall and means on said wall for regulating the pressure and temperature of wafer for flow through said water outlet shower water control apparatus including a valve assembly threadably connected to said water outlet and connected to a shower head or shower arm connected to said shower head for controlling the flow of water from said outlet to said shower head or shower arm connected to said shower head, said valve assembly including a rotatable valve member and an actuating arm connected to said valve member for effecting rotation thereof, an elongated rigid valve operating member pivotally connected to said actuating arm so as to be pivotally movable towards and away from said wall, said operating member being free hanging from said actuating arm and extending to a position adjacent said regulating means, and wherein when said valve member is in a closed position preventing water flow from said water outlet to said shower head or shower arm, upward movement of said operating member causes through said actuating arm rotation of said valve member away from said closed position to an open position to permit flow of water from said water outlet to said shower head or shower arm and wherein when_ said valve member is in a said open position downward movement of said operating member causes through said actuating arm rotation of said valve member towards said closed position to prevent flow of water to said shower head or shower arm.

Typically the regulating means comprises taps in the form of hot and cold taps of known configuration and a hand grip is provided at the end of the valve operating member and located in use intermediate the taps. The hot and cold taps may thus be adjusted to achieve the required temperature and pressure with flow to the shower head subsequently controlled by the control apparatus.

Alternatively, the regulating means may comprise a single mixing tap of known configuration such as a lever operated tap which may be adjusted initially to achieve the required temperature and pressure of water.

Preferably also the operating member includes or comprises a shield or cover which covers the regulating means to prevent inadvertent operation thereof after the latter have been adjusted to set the temperature and pressure required. The shield may be fixed to the operating member in which case access to the regulating means may be achieved by moving the operating member outwardly away from the regulating means or to one side of the regulating means. The shield or cover alternatively may be hingedly or pivotally mounted to the operating member for movement about a horizontal axis so that it may be hinged or pivoted upwardly to allow access to the regulating means whilst in its normal position, it adopts a generally vertical attitude overlying the regulating means. The shield or cover may incorporate means to facilitate gripping and lifting thereof.

The present invention thus provides in a further aspect, control apparatus for a shower of the type having a shower wall, an elevated water outlet extending through said wall and regulating means on said wall for regulating the pressure and temperature of water for flow through said water outlet, said apparatus including a valve assembly adapted to be threadably connected to said water outlet and to a shower head or shower arm connected to said shower head for controlling water flow from said outlet to said shower head or shower arm connected to said shower read an elongated valve operating member connected to said valve assembly and being free hanging therefrom, said operating member extending to a position adjacent said regulating means for allowing control of said valve assembly from said position, and a shield or cover connected to said operating member for shielding said regulating means to prevent inadvertent operation after adjustment thereof.

Where the regulating means comprises hot and cold taps or a single mixing tap, a guide or guides may be provided on the operating member for location between or on opposite sides of the tap or taps to limit lateral movement of the operating member. Suitably, the or each guide is located on the rear of the shield or cover.

The valve assembly may comprise any form of valve but suitably is of the type which has a valve member which is rotatable between an open and closed position. Typically the valve member may comprise a standard quarter turn mini ball-valve member. Suitably the valve member includes a turning spindle to which an actuating arm is attached. If necessary biasing means may be provided to assist opening and closing of the valve member. Suitably such biasing means is in the form of a spring tending to urge the valve member to a closed position.

BRIEF DESCRIPTION OF THE DRAWINGS

In order that the invention may be more readily understood and put into practical effect, reference will now be made to the accompanying drawings which illustrate a preferred embodiment of the invention and wherein:

FIG. 2 is an exploded view showing the components at the control apparatus of FIG. 1:

FIG. 2A is an enlarged view of the hand grip;

FIG. 4 illustrates in side view a further embodiment of the invention;

FIG. 5 is a front view of the arrangement of FIG. 4;

FIG. 6 illustrates the typical configuration of a tap shield or cover;

DETAILED DESCRIPTION OF THE PREFERRED EMBODIMENT

Figure 1:
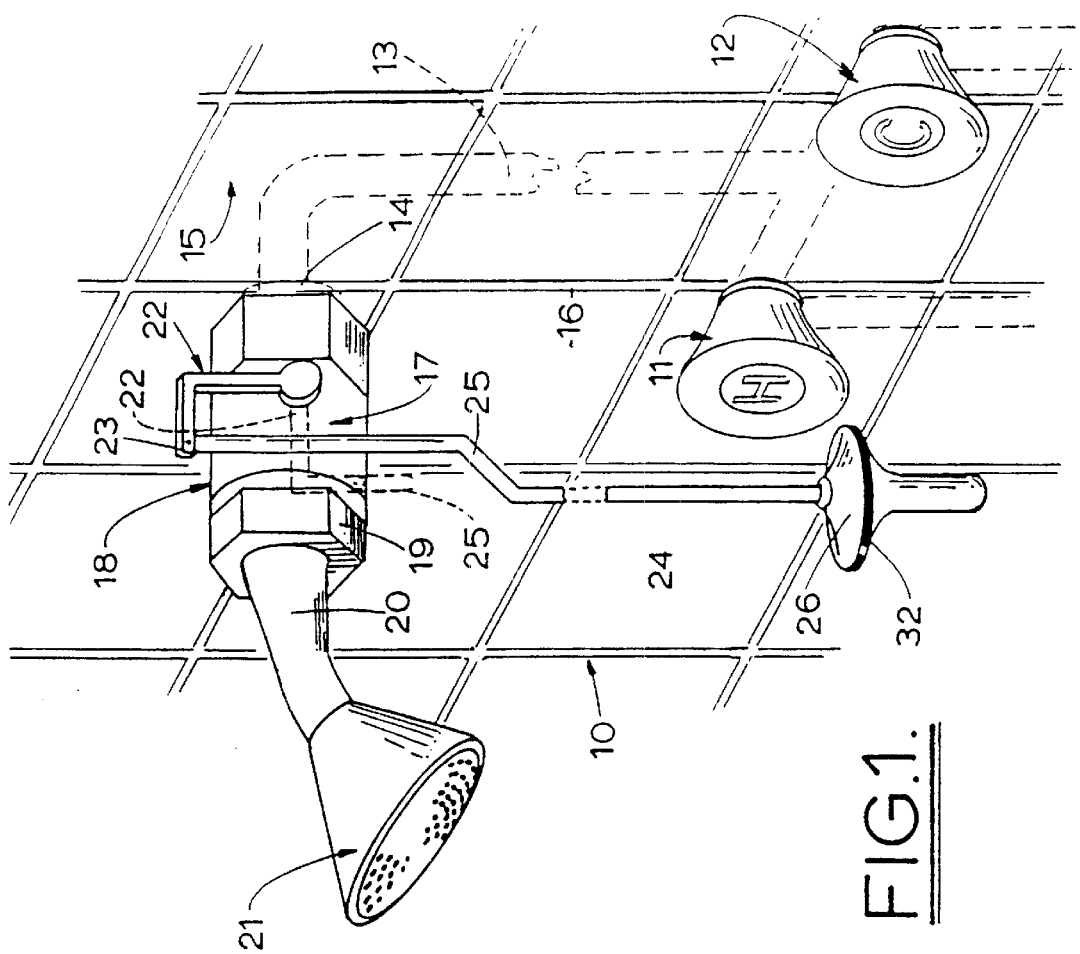
FIG. 1 illustrates schematically water control apparatus according to one aspect of the invention incorporated into a shower.
Figure 3:
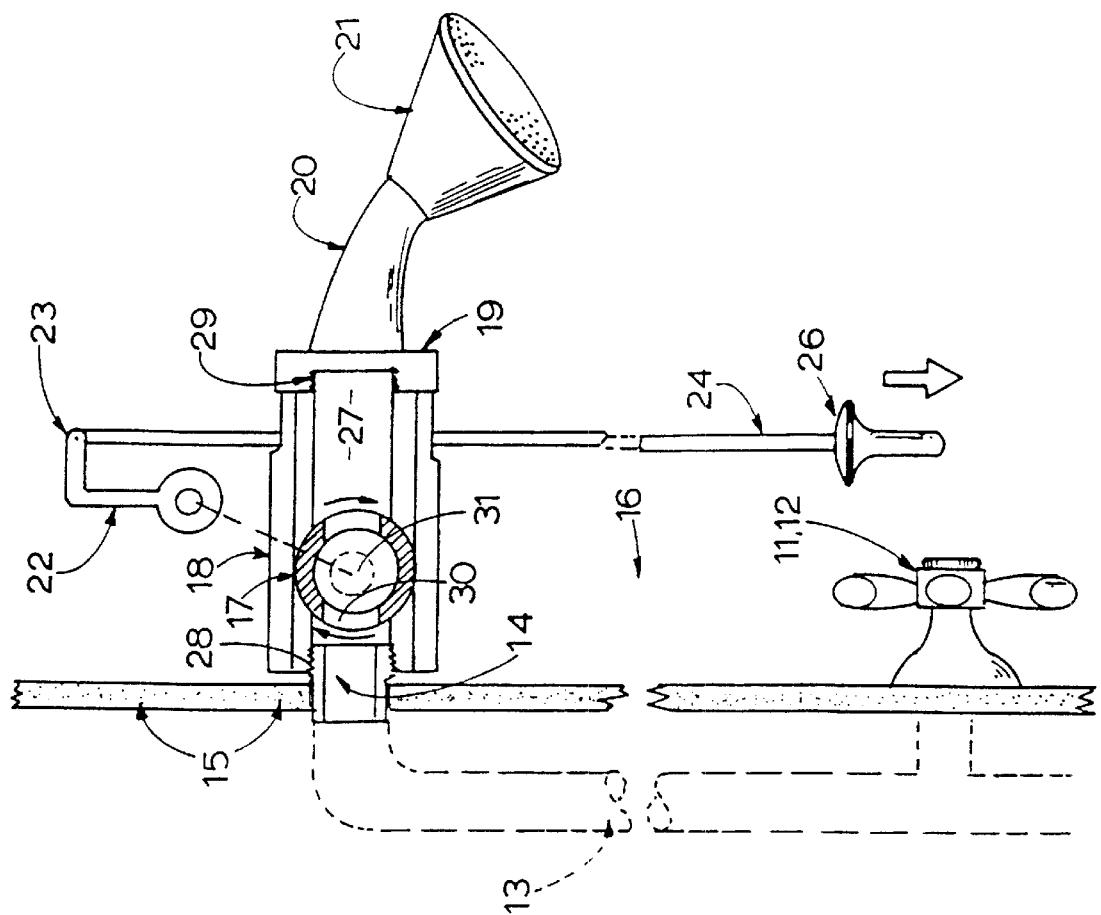
FIG. 3 illustrates in schematic side sectional view details of the operating valve.

Referring firstly to FIGS. 1 and 3, there is illustrated shower water control apparatus 10 in accordance with an embodiment of the invention installed in a shower of conventional form including temperature and pressure regulating means comprising hot and cold taps 11 and 12 attached to a typical plumbing combination including a water supply conduit 13 leading from the taps 11 and 12 terminating in a wall outlet 14 which normally extends through the wall 15 of the shower recess 16 The control apparatus 10 according to a preferred form of the present invention includes a valve assembly 17 having a housing 18 attached to the wall outlet 14 at one end and at its other end to conventional shower head wall attachment coupling 19 which is connected to an arm 20 terminating in a shower rose or spray head 21. The valve assembly 17 includes an actuating arm 22 to effect opening and closing of the valve assembly 17 as described further below.

Pivotally attached to the actuating arm 23 at 23 is an operating rod 24 which harass freely downwardly from the valve assembly 17 to terminate adjacent the taps 11 and 12. The rod 24 may be stepped to one side at 25 so that a lower portion thereof is located in a position substantially vertically between the existing taps 11 and 12. The rod 24 is provided with a hand grip 26 to facilitate valve operation as described further below.

Referring now to FIG. 3, there is illustrated a typical arrangement for the valve assembly 17 including the housing 18 in which is located a flow passage 37, the housing 18 being threaded at one end 28 for attachment to the outlet 14. A externally threaded spigot 29 extending around the flow passage 27 is provided at the opposite end of the housing 18 for threaded connection to the coupling 19 and thus to the shower arm 20.

In this embodiment, a part spherical valve member 30 is provided in the passage 27 and the actuating arm 22 is in the form of a right angled elbow shaped member attached to the spindle 31 of the valve member 30 with the operating rod 24 pivotally or hingedly attached at 23 to the tree end thereof. As stated above, the rod 24 terminates in a hand grip 26, gripping and movement of which in opposite vertical directions effects rotation of the arm 22 and thus the valve member 30 and opening and closing of the passage 27. The hand grip 26 is located intermediate the taps 11 and 12 to enable operation both of the taps 11 and 12 and valve assembly 17 from one operating zone. The hand grip 26 suitably has sufficient weight to form the rod 24 into a pendulum-like member which may pivot away and towards the existing shower wall from a stable position between the existing taps 11 and 12.

Where the shower is required to be operated after the required temperature and pressure have been adjusted by the taps 11 and 12, the hand grip 26 is grasped by the user and pushed upwardly from the closed position shown in dotted outline in FIG. 1. This causes rotation of the arm 22 and valve member 30 to open the passage 27 allowing water at the desired temperature and pressure to flow from the shower rose or spray head 21. Turning off the shower simply requires the hand grip 26 to be pulled downwardly to cause the arm 22 to move back to the position shown in dotted outline and valve member 30 to rotate in the opposite direction to close the passage 27.

A similar arrangement, may be provided where a single inbuilt existing mixing valve is used in place of the two horizontally spaced taps 11 and 13 or where vertically spaced taps are used.

It will be appreciated that the control apparatus provides to the user a means for significantly reducing water consumption by not wasting water in adjusting temperature and pressure flow from a shower whilst applying soap, shampoo, etc and before use. This is becoming more important where a user pays system applies. The user can then stop and start the shower apparatus 21 as required by simple operation of the rod 24. In addition to providing a saving in water, energy and "water down the drain", extended tap washer and O-ring life can be expected of the taps 11 and 12.

The apparatus of the invention may be constructed from readily available components such as plastics or metals such as brass and therefore is cost effective both in regards to initial cost and subsequent water usage. It will be appreciated that the valve assembly a 17 may be of many different configurations. For example it may incorporate a spiral spring to assist closing. The embodiments described show a rotatable quarter turn valve used to more quickly and efficiently achieve the desired pre-set temperature/pressure than existing half and three quarter turn conventional tap valve regulating means.

To prevent damage to the shower recess such as to tiles on the wall by the weighted hand grip 26, the hand grip 26 may be provided with a suitable cushioning member. For example and with reference to FIG. 2A a circumferential groove 32 in the periphery of the hand grip 26 may be provided with an O-ring 33 which serves the purpose of a rubber butter ring. Thus if the hand grip 26 is inadvertently knocked or pushed against the wall 17, the impact is taken by the O-ring 33.

The apparatus of the invention may be applied to existing showers by simply detaching the existing shower head 21 or arm 20 carrying the shower head 21, attaching the housing 18 and reattaching the shower head 21 or arm 20 carrying the shower head 21 to the housing 18. No interference with other parts of the shower is required or disturbance of the shower wall.

Referring now to FIGS. 4 and 5, there is illustrated a further embodiment of the invention in which like components to the components of FIGS. 1 to 3 have been given like numerals. In this embodiment, the rod 24 is provided with a transversely extending hand grip 34 to facilitate valve operation as described further below. Hingedly mounted at 35 to the lower end of the rod 24 for movement about a horizontal axis is a shield or cover 36 in the form or a planar member, the shield or cover 36 normally occupying a substantially vertical attitude to overly and shield the taps 11 and 12. A handle 37 is fixed centrally to the shield 36 to enable it to be hinged upwardly as shown to dotted outline in FIG. 4 to permit access to the taps 11 and 12. A pair of guides 38 are located on the rear side of the shield 36 for location between the taps 11 and 12. The guides 38 in this embodiment are in the form of a pair of spaced flanges but may be of any other configuration.

In use, the cover 36 may be hinged upwardly by means of the handle 37 to allow access to the taps 11 and 12 to allow for adjustment of the temperature and pressure required at the shower rose or spray head 21. When the cover 36 is released to adopt its vertical attitude, the guides 38 restrict movement of the rod 24 to the left or right so that the hot and cold taps 11 and 12 are always covered. Where the shower is required to be operated, the hand grip 34 is grasped by the user and pushed upwardly. This opens the valve assembly 17 allowing water at the desired temperature and pressure to flow from the shower rose or spray head 21. Turning off the shower simply requires the rod 24 to be pulled downwardly from the FIG. 4 position to close the valve assembly 17. The cover 36 is of such a width that it always covers the hot and cold taps 11 and 12 when moved up and downs to close and open the valve assembly 17.

A similar arrangement may be provided where a single mixing valve is used in place of the two taps 11 and 12 except in this instance the cover 36 does not have to be of the same width. In addition, the guides 38 may be located on opposite sides of the mixing valve to restrict movement of the cover 36 away from the valve. Suitably, the cover 36 incorporates instructions as to use of the apparatus as shown in FIG. 6.

In the FIGS. 4 to 6 embodiment, the shower arm 20 is a pivotally mounted arm however it will be appreciated that this may be in the form of the FIG. 1 embodiment.

Figure 7:
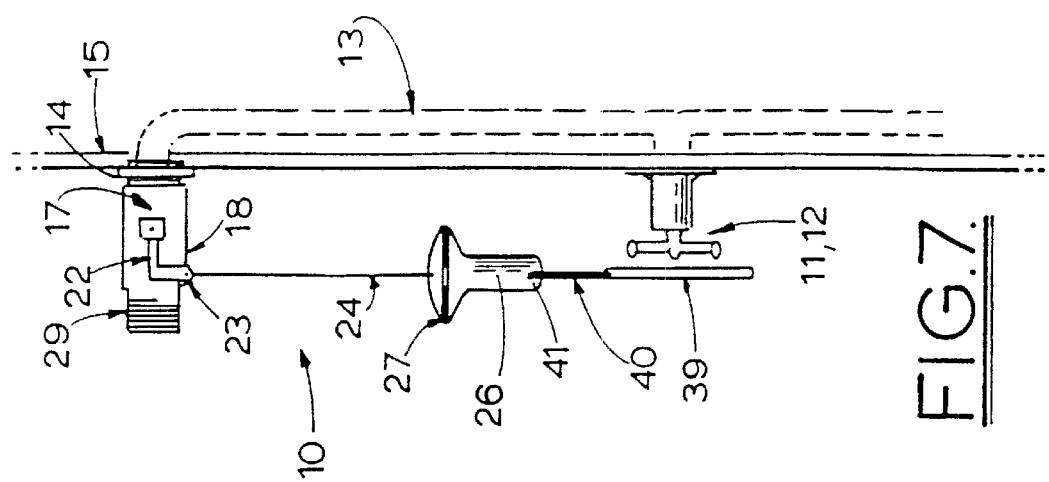
FIG. 7 illustrates in side view a further embodiment of the invention.
Figure 8:
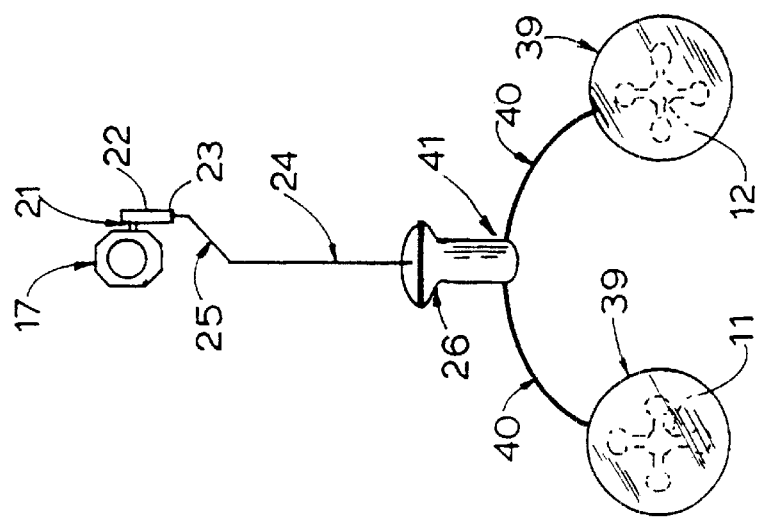
FIG. 8 is a front view of the arrangement of FIG. 7.
Figure 9:
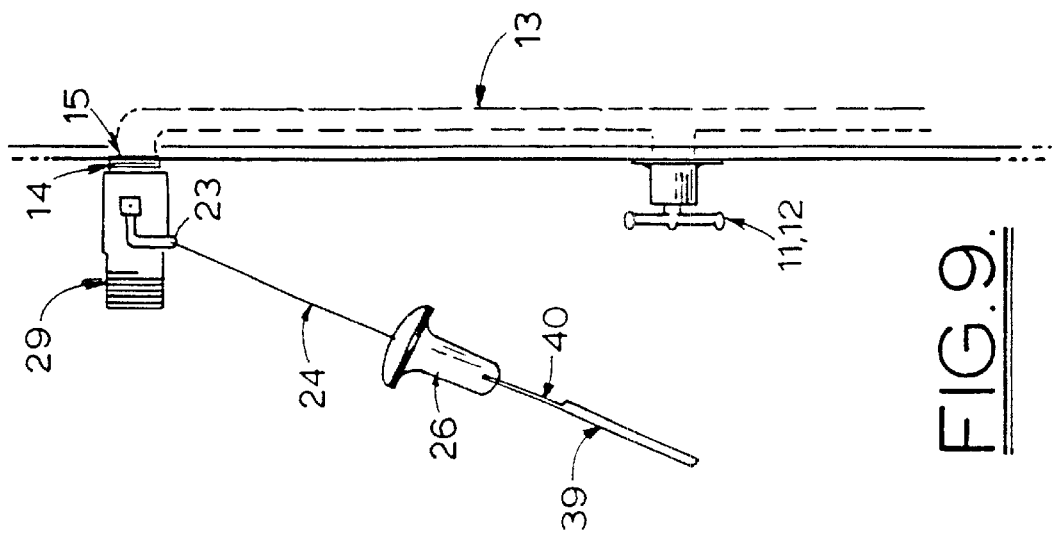
FIG. 9 illustrates the manner in which access to the taps is obtained

Referring now to FIGS. 7 to 9, there is illustrated yet a further embodiment of the invention again in which like components to the components of FIGS. 1 to 3 have been given like numerals. In this embodiment, the hand grip 26 is provided at a higher elevation alone the rod 24. Further the tap cover or shield comprises a pair of separate planar shield members 39 which are connected by relatively stiff but bendable wires 40 to the lower end of the hand grip 26 at 41 where they extend into or through holes in the hand grip 26. The use of the wires 39 allows the positions of the shield members 39 to be adjusted by bending the wires 40 as desired to suit differing configurations and positioning of the taps 11 and 12.

To obtain access to the taps 11 and 12, the shield members 39 are simply pivoted upwardly with the arm 24 about the pivot connection 23 as shown in FIG. 9. The taps 11 and/or 12 may then be adjusted and the shield members 39 then released or allowed to pivot back to the shielding position of FIG. 1. The shield members 39 are of such a size as to cover or shield the taps 11 and 12 both in the on and off positions of the valve assembly 17. The shield members 39 tray be constructed of any materials such as corrosion resistant metal or plastics as may the cover 36 of FIG. 6.

The apparatus may be substantially varied in configuration and design and used with showers of many different forms. Similarly any form of shower head or rose may be used with the apparatus. Further the apparatus may be incorporated into a shower head or shower arm rather than being a separate device located between the water outlet and shower head or arm.

Whilst the above has been given by way of illustrative embodiment of the invention, all such modifications and variations thereto as would be apparent to persons skilled in the art are deemed to fall within the broad scope and ambit of the claims as defined herein.

What is claimed is:

1. Control apparatus for a shower having a shower wall, an elevated threaded water outlet extending through said wall and regulating means on said wall for regulating the pressure and temperature of water for flow through said water outlet, said apparatus including a housing, said housing being threaded at one end for connection to said threaded water outlet and at its opposite end for connection to a shower head or shower arm connected to said shower head, said housing including a water flow passage extending therethrough from said one end to said opposite end, a rotatable quarter-turn valve member in said housing for controlling flow from said regulating means through said passage and in use to said shower head or shower arm connected to said shower head, a valve actuating arm connected to said valve member for effecting rotation thereof, said valve actuating arm being located externally of said housing and having a free end remote from its connection to said valve member, and an elongated rigid operating member pivotally connected to the free end of said arm so as to be pivotally movable towards and away from said shower wall, said operating member freely hanging from said valve actuating arm, said operating member terminating in a hand grip located in use adjacent said regulating means but spaced from said wall, and wherein said hand grip may be grasped and moved vertically to move said operating member in opposite directions to cause rotation of said valve actuating arm and said valve member and permit flow of water through or prevent flow of water through said flow passage to said shower head or shower arm connected to said shower head, and wherein when said valve member is in a position permitting said flow through said flow passage, vertical downward movement of said operating member causes said valve member to move to a position preventing flow through said flow passage.

2. Control apparatus for a shower according to claim 1 wherein said hand grip includes a cushioning member to prevent damage to said wall of said shower.

3. Control apparatus according to claim 1 wherein said operating member includes or comprises a shield or cover for covering the regulating means to prevent inadvertent operation thereof.

4. Control apparatus according to claim 3 wherein said shield is fixed to said operating member and wherein access to the regulating means is achieved by pivotally moving the operating member outwardly away from the regulating means.

5. Control apparatus according to claim 3 wherein said shield or cover is hingedly or pivotally mounted to said operating member for movement about a horizontal axis whereby access to the regulating means may be obtained by hingedly or pivotally moving said shield or cover upwardly.

6. Control apparatus according to claim 5 wherein said shield or cover includes means to facilitate gripping and moving thereof.

7. Control apparatus according to claim 5 wherein said operating member includes a guide or guides for location between or on opposite sides of said regulating means to limit lateral movement of the operating member and shield or cover.

8. Control apparatus according to claim 7 wherein the or each said guide is located on a rear of said shield or cover.

9. Control apparatus according to claim 3 wherein said regulating means comprises a pair of taps and wherein said shield comprise separate shield members totaled in use over the respective said taps.

10. Control apparatus according to claim 9 wherein said shield members are mounted adjustably to said operating member.

11. In a shower having a shower wall, an elevated threaded water outlet extending through said wall and means on said wall for regulating the pressure and temperature of water for flow through said water outlet, shower water control apparatus including a valve assembly threadably connected to said water outlet and connected to a shower head or shower arm connected to said shower read for controlling the flow of water from said outlet to said shower head or shower arm connected to said shower head, said valve assembly including a rotatable valve member and an actuating arm connected to said valve member for effecting rotation thereof, an elongated rigid valve operating member pivotally connected to said actuating arm so as to be pivotally movable towards and away from said wall, said operating member being free hanging from said actuating arm and extending to a position adjacent said regulating means, and wherein when said valve member is in a closed position preventing water flow from said water outlet to said slower head or shower arm, upward movement of said operating member causes through said actuating arm rotation of said valve member away from said closed position to an open position to permit flow of water from said water outlet to said shower head or shower arm and wherein when said valve member is in said open position, downward movement of said operating member causes through said actuating arm rotation of said valve member towards said closed position to prevent flow of water to said shower read or shower arm.

12. Shower water control apparatus in a shower according to claim 11 wherein said valve member comprises a quarter turn valve member.

13. Shower water control apparatus in a shower according to claim 11 wherein said operating member terminates in a hand grip, said hand grip including a cushioning member to prevent damage to said wall of said shower.

14. Shower water control apparatus in a shower according to claim 11 wherein said operating member includes or comprises a shield shielding said regulating means to prevent inadvertent operating thereof.

15. Shower water control apparatus in a shower according to claim 14 wherein said shield is fixed to said operating member and wherein access to said regulating means is achieved by pivoting said operating member outwardly from said wall and away from said regulating means.

16. Shower water control apparatus in a shower according to claim 15 wherein said shield includes a pair of spaced shield members, said shield members being connected via adjustable arms to said operating member.

17. Shower water control apparatus in a shower according to claim 11 where said shower head is connected to a shower arm and wherein said connection between said valve assembly and shower read is formed by incorporating said valve assembly into said shower arm.

18. Control apparatus for a shower having a shower wall, an elevated water outlet extending through said wall and regulating means on said wall for regulating the pressure and temperature of water for flow through said water outlet, said apparatus including a valve assembly adapted to be threadably connected to said water outlet and to a shower head or shower arm connected to said shower head for controlling water flow from said outlet to said shower head or shower arm connected to said shower read an elongated valve operating member connected to said valve assembly and being free hanging therefrom, said operating member extending to a position adjacent said regulating means for allowing control of said valve assembly from said position, and a shield or cover connected to said operating member for shielding said regulating means to prevent inadvertent operation after adjustment thereof.

* * * * *